Nov. 2, 1965  E. K. FRANKE  3,215,135
MINIATURE PRESSURE GAUGE FOR THE MEASUREMENT
OF INTRAVASCULAR BLOOD PRESSURE
Filed Feb. 4, 1963
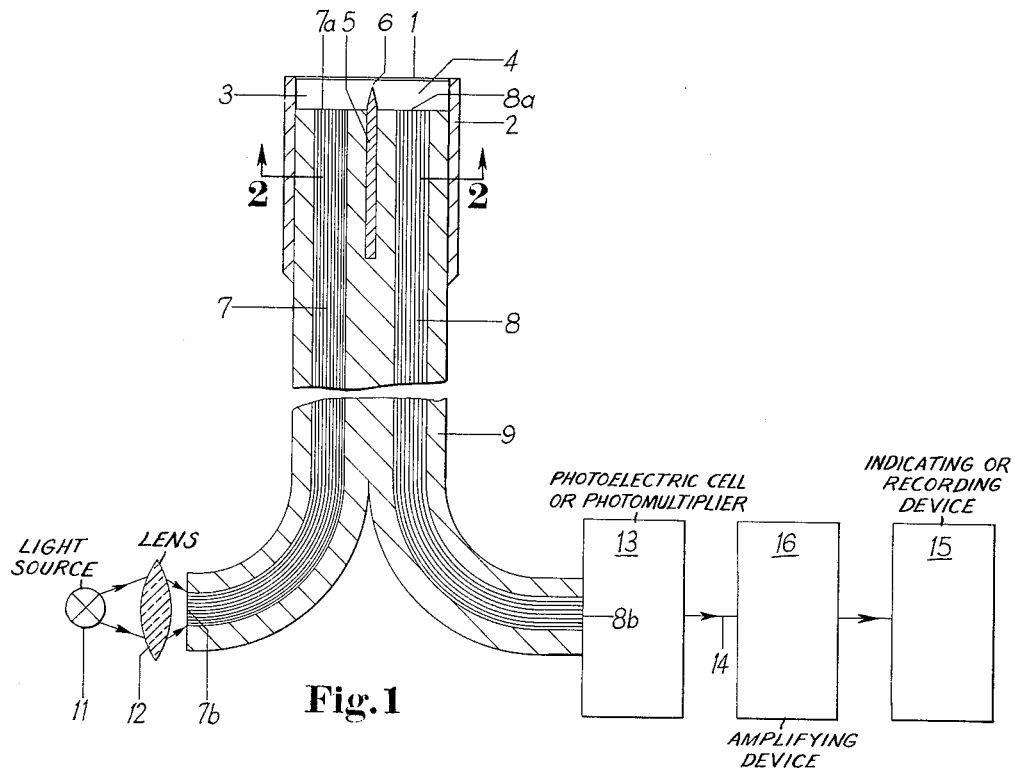
Fig. 1
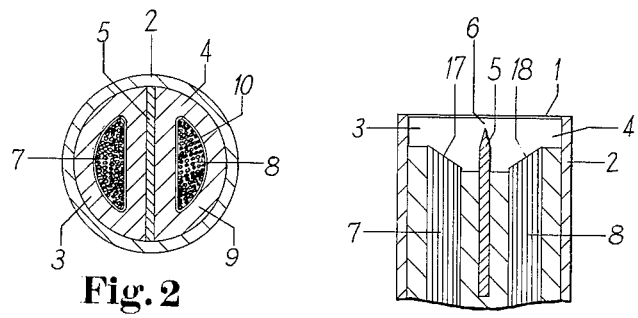
Fig. 2
Fig. 3
INVENTOR.
ERNST K. FRANKE,
BY
Yungblut, Melville, Strasser & Foster
ATTORNEYS.

United States Patent Office 3,215,135
Patented Nov. 2, 1965

3,215,135
MINIATURE PRESSURE GAUGE FOR THE MEASUREMENT OF INTRAVASCULAR BLOOD PRESSURE
Ernst K. Franke, 854 Ludlow Ave., Cincinnati, Ohio
Filed Feb. 4, 1963, Ser. No. 255,896
10 Claims. (Cl. 128—2.05)

The invention relates to pressure measuring devices. It will be described in an exemplary embodiment useful for measuring the blood pressure, and more particularly in an embodiment which is a miniature device for measuring and recording intravascular blood pressure.

At the present time, intravascular blood pressure is measured by inserting a catheter into a blood vessel, and connecting the catheter outside the body with a strain gauge pressure meter. The meter consists essentially of a housing containing a membrane one side of which is in effective connection with the catheter. Thus the membrane will be deflected by changes in pressure; and a strain gauge is used to sense the degree of deflection of the membrane when pressure is applied to it.

This type of apparatus involves certain disadvantages. The catheter tube must be filled with a fluid (e.g. Ringer's solution). The pressure will be transmitted from the interior of the blood vessel through the open end of the catheter tube by means of the fluid column inside the tube, before it can act on the membrane in the housing. Thus the frequency response of the device is likely to be poor because of the relatively large mass of the fluid column inside the catheter tube. Compliance of the walls of the catheter tube is another source of error. Further, it is difficult to fill the catheter tube without introducing small air bubbles. These further detract from the frequency response of the device, as will be evident. Moreover, the type of apparatus just described does not lend itself to miniaturization.

While attempts have been made to locate a pressure sensitive membrane in a housing of such small size as to permit its introduction directly into a blood vessel, the means hitherto proposed for sensing the deflection of the membrane have been of magnetic or electrostatic character. These have not met with success, and so far as is known, no intravascular blood pressure gauges employing such means are commercially available.

It is an object of the present invention to provide a pressure measuring device which is not subject to the above mentioned disadvantages.

It is an object of the present invention to provide such a pressure measuring device in which the deflectable membrane is in direct contact with the fluid to be measured, and the actual pressure translation takes place at or within the fluid transporting vessel.

It is an object of the present invention to provide a device which has a relatively low sensitivity to temperature change.

It is an object of the present invention to provide a device which is characterized by an increased frequency response (i.e. a high degree of faithfulness of recording rapid rates of change in pressure).

These and other objects of the present invention which will be described hereinafter, or will be understood by one skilled in the art upon reading these specifications, are accomplished by that structure and arrangement of parts of which certain exemplary embodiments will now be described. Reference is made to the drawings wherein:

FIGURE 1 is a diagrammatic illustration, partly in cross-section, of the device of the present invention.

FIGURE 2 is a cross-sectional view taken along the section line 2—2 of FIGURE 1.

FIGURE 3 is a diagrammatic illustration of a second embodiment of the present invention.

Briefly, the practice of this invention involves the introduction of a miniaturized housing containing a diaphragm directly into the fluid to be measured, and the sensing of the deflection of the membrane by optical means utilizing fibre optics light guides, as hereinafter more fully described.

One embodiment of the present invention is diagrammatically represented in FIGURE 1. A deformable membrane 1 is located at the front end of a housing 2. While the housing may have any cross-sectional configuration, it is preferably cylindrical, with a circular membrane. The membrane 1 may be made of metal, rubber, or synthetic materials and may be affixed to the front end of the housing by cementing, welding, or the like. The membrane may be formed as an integral part of the housing. The housing 2 is divided into two longitudinal chambers 3 and 4, by a dividing wall or partition 5. One end of the dividing wall 5 is adjacent the membrane 1 with a narrow gap 6 therebetween. It will be understood by one skilled in the art that the housing 2 is of such size that it may be conveniently inserted into a blood vessel. The gap 6 is of the order of a few thousandths of an inch, and joins the two chambers 3 and 4.

A fiber optics light guide 7 extends into the chamber 3. A second fiber optics light guide 8 extends into the chamber 4. The ends or faces 7a and 8a of the light guides are positioned at a distance from the membrane which is slightly greater than the dimensions of the gap 6. The light guides 7 and 8 may extend rearwardly of the housing 2 for any reasonable distance desired. For example, in the normal use of such a blood pressure measuring instrument, a length of at least two feet would be desirable. Those portions of the light guides 7 and 8 which extend rearwardly of the housing 2 may be located in a catheter tube or other flexible tubing 9. The tubing 9 may be connected to the housing 2 by any suitable means including cementing and welding. The tubing 9 may be unitary and continuous, or branching depending upon the arrangement of the elements to which the light guides lead. The individual light guides 7 and 8 will generally be encased in or coated with a light insulating material indicated at 10 (FIG. 2). At any rate, the light guides, if enclosed in the same tube, should be insulated against light transfer and against external sources of light.

The terms "fibre optics" and "light guides" refer to the well known properties of certain transparent substances to conduct light in such fashion that if light is introduced into one end of a rod or strand of the material the greater part of the light so introduced will be emitted at the other end of the rod or strand, despite the fact that such light transmitting element may be bent or curved intermediate its ends. The present invention may be practiced with any of the materials known in the art to possess the light transmitting properties just outlined.

The term "fibre optics" further contemplates the use of light transmitting rods or strands of small cross-sectional areas. The rods or strands may be circular in cross-sectional shape, but they need not necessarily be so. They may take the semi-circular cross-sectional shape illustrated in FIGURE 2 or any other suitable cross-sectional shape. Further, the members 7 and 8 need not consist of single rods or strands, but may be made up each of a plurality of smaller fibres, with a gain in flexibility. The term "light guide" as used herein contemplates both a single rod or strand used alone, or a bundle or assembly of light conducting fibers used together. Since the invention is best practiced with light guides which are quite flexible, it is preferred to use a material which has a minimum of stiffness when formed into rods, strands or fibers of desired cross sectional areas. As a single but non-limiting example of a suitable material mention may be made of a clear and transparent synthetic resin of the phenol-aldehyde type. Optical glass may be used and if formed into fibers of small enough cross-section, will be found to be satisfactorily flexible.

A source of light 11 is focused by means of a lens 12 on the end 7b of the light guide 7. The end 8b of the light guide 8 leads to an element 13. The element 13 is diagrammatically illustrated as a rectangle, and may be considered to represent a photoelectric cell or a photomultiplier, both of which are well known in the art. The photoelectric cell or photomultiplier 13 is connected as at 14 to an indicating or recording device 15. This indicating or recording device 15 may take several forms. For example, while the form of the indicating or recording device constitutes no limitation on the present invention, it may comprise an electric meter, an oscilloscope, or a device of the type that makes a permanent record on paper or the like. The output signal of the photoelectric device 13 may be amplified by a suitable amplifying device 16.

The device of this invention is used as follows. Light, originating from the source 11 is focused by the lens 12 on the end 7b of the light guide 7. The light will follow the fibers of the guide and enter the chamber 3 of the housing 2. From the chamber 3 the light is diffusedly reflected into the chamber 4 through the gap 6. As will be understood by one skilled in the art, the interior of chambers 3 and 4, as well as the back of the membrane 1, may be coated with a suitable material in order to minimize absorption of light in the chambers, as for example, white paint or the like.

A fraction of the light in the chamber 4 is incident upon the face 8a of the light guide 8, and is channeled through this light guide to the sensitive element of the photoelectric device 13. The output signal of the photoelectric device will be proportional to the intensity of the light incident upon the end 8a of the light guide 8. The output signal may be amplified by the amplifier 16 and observed or recorded by the device 15.

It will be understood that when the membrane 1 is brought into contact with a liquid the pressure of which is to be determined, the pressure of the liquid will control the size of the gap 6. Moreover, if the pressure of the liquid varies, the size of the gap will vary also. This variation of gap is proportional to the variations of the fluid pressure, provided that the average size of the gap is large compared to its variation. Since the amount of light which is diffused from chamber 3 into chamber 4 depends upon the gap size, it will also vary when the gap size is varied. The variation of the light flux will therefore also be proportional to the pressure acting on the membrane 1. The variations of light flux will be transmitted by the light guide 8 and sensed by the photoelectric device 13, and converted into an electrical signal. This electrical signal may ultimately be recorded, observed, or otherwise processed.

Figure 3 illustrates a second embodiment of the present invention, which differs from that shown in Figure 1 only in that the light guides 7 and 8 are provided with faces 17 and 18 which are cut at an angle with respect to the axes of the light guides. It will be understood by one skilled in the art, that other configurations of the faces 17 and 18 may be used to improve the effectiveness of the light guides.

Modifications may be made in the invention without departing from the spirit of it. For example, through the use of light guides and their flexibility, the housing 2 may be of any suitable configuration, as for example straight, curved, or hooked. It will be understood by one skilled in the art that the housing 2 and membrane 1 should be made of materials of low coefficient of expansion so that surrounding temperature changes will have little or no effect on the gap 6. It will further be understood that the pressure measuring device of the present application will have an excellent frequency response. Actual pressure translation ends at the gap 6 eliminating the problems inherent in fluid columns and the like. This structure, also, lends itself to easy handling and easy sterilization.

It will be seen that this invention permits the construction of a device of exceedingly small dimensions suitable for surgical insertion into the body and particularly into a blood vessel. The connecting means between the housing 2 and the light source and photocell may have no greater cross-sectional dimension than the housing. It may be smaller, or larger, and it will be flexible. After insertion of the housing into the blood vessel, it is possible to move the housing along the blood vessel to a position adjacent some particular organ at which the intravascular pressure is to be observed or recorded. Irrespective of the actual position of the housing 2, a pressure indication will be obtained directly proportional to the pressure at the housing, not affected significantly by changes in temperature, and not affected by the inertia of a column of liquid, the compliance of the walls of a catheter tube, or the possible presence of gas within the tube.

The invention having been described in certain exemplary embodiments, what is claimed as new and desired to be secured by Letters Patent is:

1. In a device for measuring fluid pressure at a remote point, an elongated flexible element, two flexible light guide elements extending the length of the first mentioned element, a housing attached to one end of said elongated flexible element, a diaphragm extending across said housing and responsive to fluid pressure, and a partition device at the same end of said elongated flexible element, located between said light guide elements and extending toward said diaphragm but spaced therefrom to form a gap through which light can be transmitted from one of said light guide elements to the other.

2. The structure claimed in claim 1 including a light source, means for focusing said light on an end of one of said light guide elements remote from said housing, and means at the end of said other light guide element remote from said housing for receiving light therefrom and translating it to an electric current.

3. The structure claimed in claim 1 where said flexible light guide elements are fiber optics light guides, each of said guides comprising a plurality of thin strands.

4. The structure claimed in claim 1 wherein said flexible element and said housing are of such size as to be easily insertable in a blood vessel.

5. The structure claimed in claim 2 wherein said last mentioned means comprises a photocell device and wherein a recording device is connected to said photocell device.

6. The structure claimed in claim 2 wherein said last mentioned means comprises a photocell device, and wherein an indicating device is connected to said photocell device.

7. The structure claimed in claim 3 wherein the ends of said light guides within said housing are spaced from said diaphragm a distance slightly greater than said gap between said diaphragm and said partition device.

8. The structure claimed in claim 3 wherein said flexible light guide elements are light insulated from each other.

9. The structure claimed in claim 7 wherein said ends of said light guides within said housing are angled equally and oppositely toward said gap.

10. The structure claimed in claim 7 wherein the interior of said housing, said partition device, and said diaphragm are coated with light reflecting material.

References Cited by the Examiner
UNITED STATES PATENTS 3,068,742   12/62   Hicks _____ 128—397 X
3,078,841   2/63    Brownson _____ 128—2.05

RICHARD A. GAUDET, *Primary Examiner.*
LOUIS R. PRINCE, *Examiner.*